United States Patent [19]

Prietzel et al.

[11] Patent Number: 4,802,059

[45] Date of Patent: Jan. 31, 1989

[54] MULTIPLE LOW-VOLTAGE CIRCUIT BREAKER HAVING BUS BARS

[75] Inventors: Günter Prietzel; Georg Sprenger; Reinhard Kugler, all of Berlin, Fed. Rep. of Germany

[73] Assignee: Siemens Aktiengesellschaft, Berlin and Munich, Fed. Rep. of Germany

[21] Appl. No.: 188,186

[22] Filed: Apr. 28, 1988

Related U.S. Application Data

[63] Continuation of Ser. No. 922,298, Oct. 23, 1986, abandoned.

[30] Foreign Application Priority Data

Nov. 6, 1985 [DE] Fed. Rep. of Germany ....... 3539672

[51] Int. Cl.[4] .............................................. H02B 1/20

[52] U.S. Cl. .................................... 361/361; 361/355

[58] Field of Search ................ 361/361, 355, 341-342; 174/149 N; 335/202, 6; 200/293

[56] References Cited

U.S. PATENT DOCUMENTS 2,862,995 12/1958 Hercules .............................. 174/99

3,288,956 11/1966 Jencks et al. .......................... 200/50

3,293,503 12/1966 Herrmann et al. .................. 317/119

4,277,664 7/1981 Maier et al. ......................... 200/293

FOREIGN PATENT DOCUMENTS 989058 11/1972 Canada ................................ 361/355

0071385 2/1983 European Pat. Off. .

2646123 10/1976 Fed. Rep. of Germany ...... 361/355

3223468 1/1983 Fed. Rep. of Germany .

*Primary Examiner*—E. A. Goldberg

*Assistant Examiner*—Lincoln Donovan

*Attorney, Agent, or Firm*—Kenyon & Kenyon

[57] ABSTRACT

In a low-voltage circuit breaker, terminal points for connecting contact arrangements to stationary bus bars are provided. Between the terminal points and the stationary bus bars, connecting bars are arranged which are braced relative to the housing of the circuit breaker by support bodies against current forces. The support bodies are parts comprising relatively thin insulating material with cutouts for the connecting bars. Detent projections allow the support bodies to snap into corresponding recesses in the lateral housing walls of the circuit breaker.

7 Claims, 2 Drawing Sheets

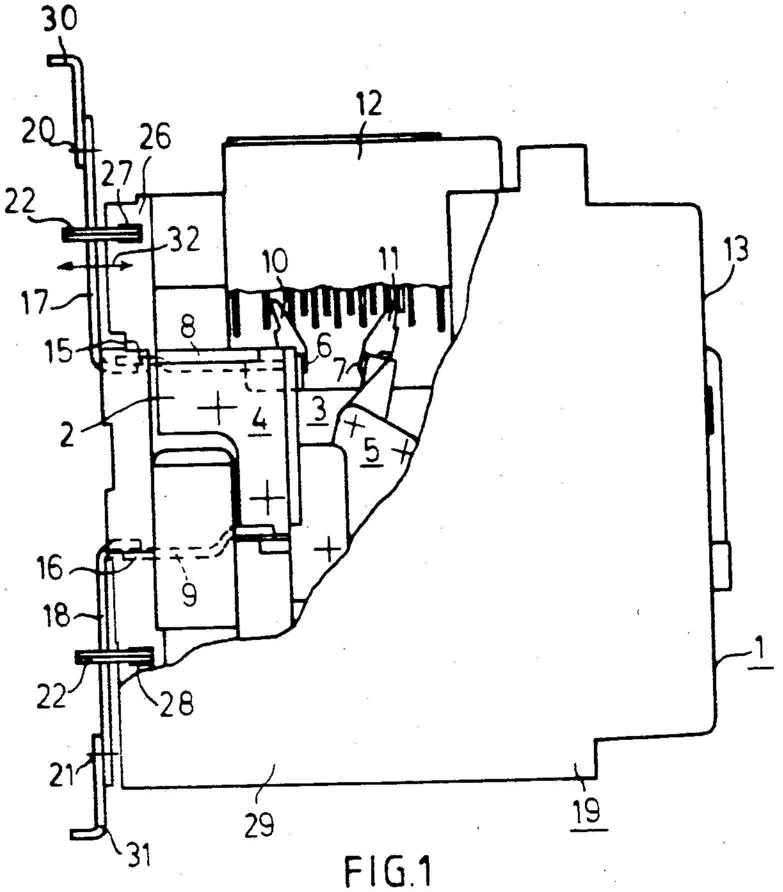
FIG.1
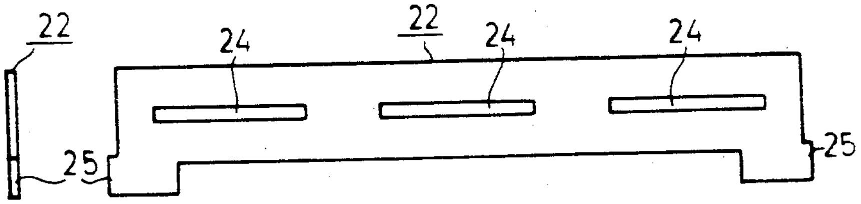
FIG.4
FIG.3

MULTIPLE LOW-VOLTAGE CIRCUIT BREAKER HAVING BUS BARS

This application is a continuation of application Ser. No. 922,298, filed 10-23-86, now abandoned.

BACKGROUND OF THE INVENTION

The present invention relates to a multipole low-voltage circuit breaker having bus bars for connecting contact arrangements of the circuit breaker to one or more circuits, where the bus bars for the input side and the bus bars for the output side are arranged in a row each and both rows are arranged parallel to each other and at right angles to side walls of the circuit breaker.

A circuit breaker of this type has become known, for instance, from European Pat. No. EP-A-0 071 385. There, each terminal is located at a conductor section which extends horizontally backward relative to the customary use position of the circuit breaker. Provision is made by stiffening elements that the bus bars cannot be deformed by current forces.

In this design, the circuit breaker is suited, for instance, for a withdrawable arrangement, in which suitable transition pieces or parts of the break contact arrangement are attached to the bus bars. If, on the other hand, the circuit breaker is to be incorporated fixed into a switching installation, connecting bars are required which are inserted between the terminals of the circuit breaker and the stationary bus bars. It is no problem here to connect the connecting bars to the terminals of the contact arrangement before the circuit breaker is built into the switching installation; if, however, also the connection to the stationary bus bars should be possible without difficulty if the arrangement is not aligned, the length of the connecting bars must not be less than a certain value in order to ensure good accessibility especially from the front of the circuit breaker. Due to the relative length of the connecting bars, the problem arises that the connecting bars are subjected, in the case of a short circuit, to deforming forces which can under some conditions damage not only the connecting bars themselves, but also the terminals and connecting elements.

It would basically be possible to avoid such detrimental deformations by designing the connecting bars as a fixed part of the circuit breaker and by fixing them completely accordingly except for a free end provided for connection to a stationary bus bar. Such a circuit breaker, however, would not be suitable without change also for use as a plug-in circuit breaker. Furthermore, an embedment of the connecting bars would impede the heat removal in an undesirable manner. While on the other hand, a design of the connecting bars with a cross section larger than that required for electrical considerations would increase the strength in the desired manner, the weight and the costs of the connecting arrangement would be increased considerably at the same time, however.

SUMMARY OF THE INVENTION

With the above as a starting point, it is an object of the present invention to protect exposed connecting bars designed with normal dimensions against the effects of current forces by simple means and without jeopardizing cooling efficiency.

The above and other objects of the present invention are achieved by a multipole low-voltage circuit breaker having bus bars for connecting contact arrangements of the circuit breaker to one or more circuits, the bus bars comprising bus bars for an input side and bus bars for an output side each arranged in a row and both rows being arranged parallel to each other and at right angles to side walls of the circuit breaker, and further wherein, for connecting the bus bars to connecting bars which are arranged approximately parallel to a back side of the circuit breaker and for connecting the bus bars to stationary conductors not aligned with the bus bars for the input and output side, respectively, said connecting bars are coupled by a common insulating support body having ends which are fastened to the side walls of the circuit breaker.

According to the invention, a three-pole circuit breaker, for instance, requires only two support bodies, one of which seizes connecting bars leading to the feed side of the contact arrangement, while the other support body is associated with the outgoing connecting bars. It has nevertheless been found that the very considerable forces occurring in the event of a short circuit can be intercepted reliably and damage can be avoided by the support which is provided only locally, and due to the distance remaining between the connecting bar and the housing of the circuit breaker, good heat removal is furthermore assured.

It should be possible to connect the support body in a form-locking manner to the housing of the circuit breaker, and the direction of the force transmission of the fit can be selected according to the direction of the current forces which occur predominantly. Thereby, the support body can be attached simply and without the aid of fastening elements which must be handled separately, with good support action. The firm fit between the support body and the housing of the circuit breaker can be achieved by detent projections which can snap into recesses of housing walls of the circuit breaker, elastically deforming the support body. The support body can therefore be designed in one piece and be fabricated by simple machining operations, for instance, of a suitable material, such as sheet material.

The recesses of the housing walls of the circuit breakers may be designed for accepting the detent projections of at least two support bodies. The possibility then exists in the case of circuit breakers which are designed for short circuit currents of different magnitudes but the same overall size to use one or two support bodies in parallel or more, depending on the requirement. Thus, the support bodies can be used as a standard part for a series of circuit breakers.

Especially for controlling larger current forces, it may be advantageous to use support bodies with approximately H-shaped cross sections as shaped bodies, in which the legs of the "H" are arranged parallel to the connecting bars. Such a shaped body which can be made in the manner known per se of thermo-setting material by the injection-or transfer-molding method is distinguished by high strength with little deformation as well as by favorable dielectric behavior.

Such a molded body can be fastened by screws which go through the side walls of the circuit breaker and engage the end faces of the molded body. For this purpose, a striking surface can be provided at the end faces of the support body, which is intended for contact with the end face of the associated side wall of the circuit breaker. Thereby, a screw opening located at the end face of the molded body and a corresponding opening in the side wall are aligned so that a fastening screw can be inserted.

BRIEF DESCRIPTION OF THE DRAWINGS

The invention will be explained in greater detail in the following with the aid of the embodiments shown in the figures in which:

FIG. 1 shows a low-voltage circuit breaker in a partly sectional side view, individual subassemblies being shown simplified;

FIGS. 3 and 4 show a support body for the connecting bars in two orthogonal view.

DETAILED DESCRIPTION

Figure 2:
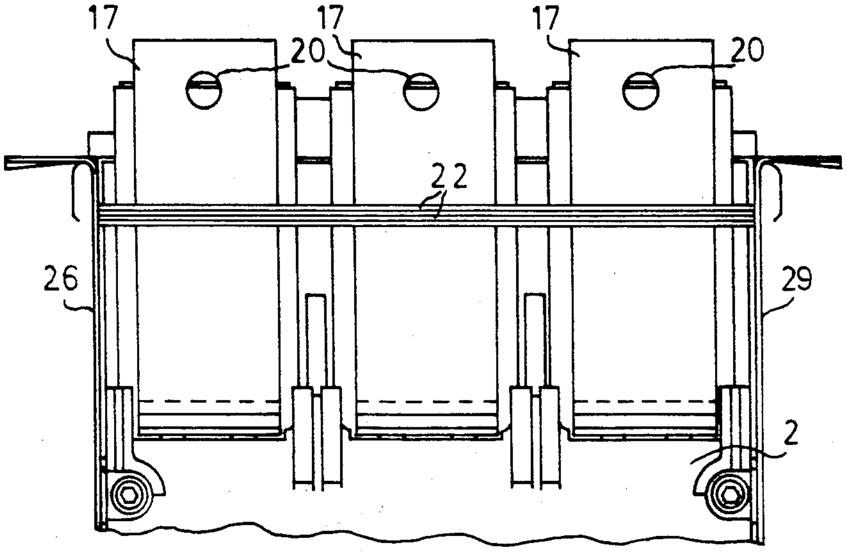
FIG. 2 shows a broken-off rear view of a circuit breaker similar to FIG. 1.

With reference now to the drawings, depending on the number of poles, the low-voltage circuit breaker 1 shown in FIG. 1 comprises contact arrangements 3 which are arranged at an insulating block 2 parallel to each other. These contact arrangements comprise a fixed part 4 and a movable part 5, the cooperating contact overlays being designated with 6 and 7. The fixed part 4 further has an arcing horn 10, and a movable part 5 has an arcing horn 11. The contact arrangement 3 of each pole is associated with an arc quenching chamber 12 which is provided with quenching baffles in a manner known per se. An actuating device, a switching mechanism and, if required, a motor drive are accommodated underneath and to the right of the contact arrangement within the housing 19 of the circuit breaker 1. These parts are not shown in detail and are in accordance with a suitable design.

For connecting the circuit breaker 1 to an external circuit, the contact arrangements 3 are equipped with upper terminals 15 attached to the insulating block 2 and lower terminals 16. Both terminals are attached to the insulator block 2; these terminal points are located at conductor sections 8 and 9 which extend in the horizontal direction with respect to an operating console 13 of the circuit breaker 1 on the back side thereof. To the terminal point 15 and 16, angled-off connecting bars 17 and 18 are connected which extend upward and downward, respectively, and are arranged extending at a distance from the back side of the circuit breaker 1. As is clearly shown in FIG. 1, the length of the connecting bars 17 and 18 is such that the connecting bars 17 and 18 are accessible from the front of the circuit breaker 1. At these points, upper stationary bus bars 30 are connected to the connecting bars 17, and lower stationary bus bars 31 to the connecting bars 18.

In FIG. 2 the circuit breaker 1 is shown partly from the rear with a view toward the upper connecting bars 17, the 16 corresponding stationary bus bars having been omitted in order 17 to show the mounting holes 20. As shown, a total of four identical support bodies 22 are arranged parallel to each other in order to support the connecting bars 17 in the desired manner. In contrast thereto, two parallel support bodies are provided in the example according to FIG. 1. The appropriate number of support bodies depends in each case on the magnitude of the current forces to be expected.

For stiffening against current forces (double arrow 32) occurring in the event of a short circuit serve support bodies 22 which are associated with the connecting bars 17 and 18 and are of completely identical design. Details of the support bodies 22 are shown in FIGS. 3 and 4. As these figures show, the support bodies 22 are relatively narrow and thin parts of a suitable insulating material and are designed corresponding to the width of the switch, and are provided with passage openings 24 corresponding to the number of holes of the circuit breaker 1. For the three respective connecting bars 17 and 18 which start from the upper terminal points 15 and lower terminal points 16 of the contact arrangement 3, two of the support bodies 22 shown in FIGS. 2 and 3 are therefore sufficient. For ease of mounting to the circuit breaker 1, fitting recesses 27 and 28 are provided. These recesses can be made wider than corresponds to the thickness of one of the support bodies 22 so that, as already mentioned, also two support bodies or a larger number can be attached if needed. In this manner, the support bodies 22 as well as the lateral housing walls 26 can be used in a series of breakers designed for different currents. As material for fabricating the support bodies 22, insulating materials in sheet form are suitable, for instance, hard woven material or other support materials impregnated with plastic.

In the embodiment shown in FIG. 1, the connecting bars 17 and 18 extend parallel to the back side of the circuit breaker 1 upward and downward. In certain cases, however, it may be advantageous to arrange a connecting bar at some angle to this direction. The described support bodes, however, can be used similarly in the same manner if recesses 27 and 28 are made in the housing walls 26 or in other parts of the housing 9 of the circuit breaker 1 in such a position that the support bodies 22 can be attached in a position adapted to the direction of the connecting bars.

The bending required for the support bodies 22 to snap into the recesses 27 and 28 can be accomplished without undue stress by elastic deformation because of the side ratio shown in FIG. 3. If, however, a different ratio should be more suitable, i.e., if the length, deviating from the example shown, is not a multiple of the height, it may be advantageous to design the detent projections as extensions deformable in themselves.

Figure 5:
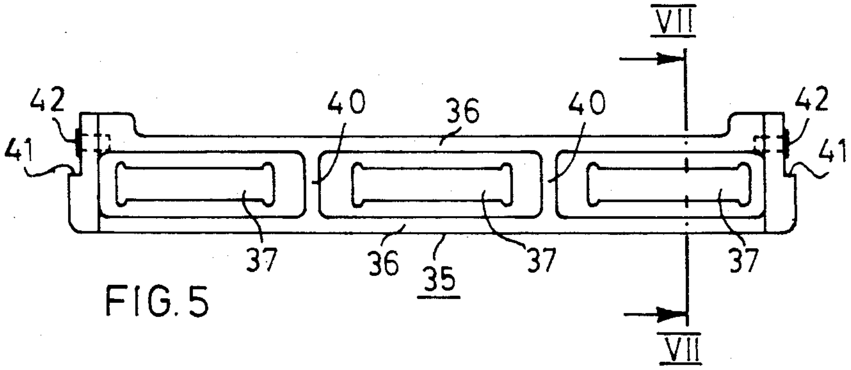
FIGS. 5, 6, and 7 show a further embodiment of a support body, and specifically in a view in the direction of passages for connecting bars as well as in a front and a cross sectional view.
Figure 6:
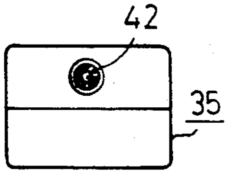
Figure 7:
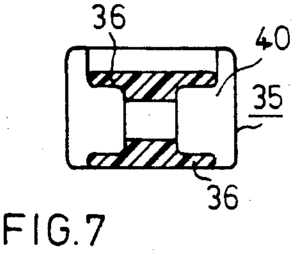

Differing from the support body 22 according to FIGS. 3 and 4, the support body 35 according to FIGS. 5, 6, and 7 is designed as a shaped part and is provided for use as an individual part. To this end, the support body 35 has an approximately H-shaped cross section as shown in FIG. 7 which represents the cross section VII—VII in FIG. 5. At the ends and between the openings 37, the H-legs 36 are connected by cross pieces 40. By this design, the support body is made to have a high bending stiffness and an advantageous dielectric behavior since the leakage paths are advantageously low.

At each of the end faces a striking surface 41 is formed by a step which is intended for making contact at the rear end face of the associated side wall of the circuit breaker. For fastening, screw holes 42 are provided, which can be formed by a tapped bushing which is anchored in the material of the support body and allows screwing the support body to the sides of walls 26 and 29.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

We claim:

1. A multipole low-voltage high current circuit breaker having bus bars for connecting contact arrangements of the circuit breaker to one or more circuits, wherein the bus bars comprise bus bars for an input side and bus bars for an output side each arranged in a row and both of said rows being arranged parallel to each other and at right angles to side walls of the circuit breaker, and further wherein, the bus bars are connected to connecting bars which are arranged approximately parallel to a back side of the circuit breaker and which connecting bars connect the bus bars to stationary conductors not aligned with the bus bars for the input and output side, respectively, said connecting bars for each of the input side and the output side are coupled by common insulating support bodies provided for each of the input side and the output side connecting bars and each support body having ends which are fastened to the side walls of the circuit breaker, said common insulating support body for each of the input side and output side being provided for spacing said connecting bars connected to each pole of said multipole circuit breaker apart in a defined orientation to prevent forces due to currents in said connecting bars from moving said connecting bars.

2. The circuit breaker recited in claim 1, wherein the support body is adapted to be connected in a form-locking manner to a housing of the circuit breaker and wherein a direction of transmission of a force by the form lock is chosen in accordance with the predominantly occurring direction of current forces.

3. The circuit breaker recited in claim 2, wherein the support body has detent projections which are adapted to snap into recesses of housing walls of the circuit breaker by elastic deformation.

4. The circuit breaker recited in claim 1, wherein the support body for a multi-pole circuit breaker has openings for a number of connecting bars corresponding to a number of poles of the circuit breaker.

5. The circuit breaker recited in claim 3, wherein the recesses of the housing walls of the housing receive the detent projections of at least two support bodies.

6. The circuit breaker recited in claim 1, wherein the support body comprises a shaped body with approximately H-shaped cross section, having legs of the "H" arranged parallel to the connecting bars.

7. The circuit breaker recited in claim 6, wherein, at end faces of the support body, a striking surface for making contact with an end face of the associated side wall of the circuit breaker and a threaded opening for a mounting screw are provided.

* * * * *